US009410511B2

(12) United States Patent
Nam et al.

(10) Patent No.: US 9,410,511 B2
(45) Date of Patent: Aug. 9, 2016

(54) VARIABLE INTAKE SYSTEM FOR VEHICLE

(71) Applicant: Hyundai Motor Company, Seoul (KR)

(72) Inventors: Jong Woo Nam, Whasung-Si (KR); Hyun Cho, Whasung-Si (KR); Joonho Lee, Whasung-Si (KR); Hanshin Chung, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 81 days.

(21) Appl. No.: 14/444,588

(22) Filed: Jul. 28, 2014

(65) Prior Publication Data

US 2015/0144088 A1    May 28, 2015

(30) Foreign Application Priority Data

Nov. 26, 2013  (KR) .................. 10-2013-0144768

(51) Int. Cl.
| | |
|---|---|
| *H01M 2/12* | (2006.01) |
| *F02M 35/10* | (2006.01) |
| *F02M 35/12* | (2006.01) |
| *B60K 13/02* | (2006.01) |
| *F02M 35/14* | (2006.01) |
| *F02M 31/16* | (2006.01) |

(52) U.S. Cl.
CPC .......... *F02M 35/10255* (2013.01); *B60K 13/02* (2013.01); *F02M 31/16* (2013.01); *F02M 35/10013* (2013.01); *F02M 35/10249* (2013.01); *F02M 35/10268* (2013.01); *F02M 35/1255* (2013.01); *F02M 35/14* (2013.01); *Y02T 10/126* (2013.01)

(58) Field of Classification Search
CPC .................. F02M 35/10255; F02M 35/10268; F02M 35/1255; F02M 35/10249; F02M 35/14; F02M 35/10013; F02M 31/16; B60K 13/02
USPC ........................................ 123/184.21, 184.57
See application file for complete search history.

(56) References Cited

U.S. PATENT DOCUMENTS

| | | | |
|---|---|---|---|
| 8,820,455 B2 * | 9/2014 | Nitawaki et al. ............. 180/68.5 |
| 2004/0112325 A1 * | 6/2004 | Criddle et al. ............ 123/198 E |
| 2006/0204840 A1 * | 9/2006 | Jeon et al. ...................... 429/152 |
| 2013/0143082 A1 * | 6/2013 | Kim ................................ 429/82 |

FOREIGN PATENT DOCUMENTS

| | | |
|---|---|---|
| JP | 9-174669 A | 7/1997 |
| JP | 2009-238697 A | 10/2009 |
| KR | 10-2013-0033579 A | 4/2013 |

* cited by examiner

*Primary Examiner* — Marguerite McMahon
(74) *Attorney, Agent, or Firm* — Morgan, Lewis & Bockius LLP (57) ABSTRACT

A variable intake system for a vehicle to regulate an amount of intake air according to driving conditions of an engine may include an air cleaner connected to an intake duct which draws in intake air and forms a flow path for the intake air inside the air cleaner, a battery assembly installed in the flow path inside the air cleaner, which includes a plurality of cooling paths that allow the intake air to flow through the plurality of cooling paths, and a valve body installed in the air cleaner and selectively varying the flow path of the intake air.

16 Claims, 7 Drawing Sheets

VARIABLE INTAKE SYSTEM FOR VEHICLE

CROSS-REFERENCE TO RELATED APPLICATION

The present application claims priority of Korean Patent Application Number 10-2013-0144768 filed Nov. 26, 2013, the entire contents of which is incorporated herein for all purposes by this reference.

BACKGROUND OF THE INVENTION

1. Field of the Invention

The present invention relates to a variable intake system for a vehicle, more particularly to a variable intake system for a vehicle which can variably regulate intake air supplied for an engine according to driving conditions.

2. Description of Related Art

Generally, an engine compartment is referred to as a space in which an engine is mounted. In the engine compartment, several components such as intake and exhaust parts including a transmission as well as an engine are integrally installed, and a battery is positioned in a predetermined position.

A variable intake system is provided in a vehicle, which variably regulates the amount of intake air supplied for the engine according to driving conditions, for example, the region of low speed and low load or that of high speed and high load.

A variable intake system according to an example is made up of the structure in which an intake duct branched into two ways is connected to an air cleaner, and a part of the intake duct can be opened in the region of low speed and low load and the whole part can be opened in the region of high speed and high load.

On the other hand, in a vehicle of which a battery is located in an engine compartment, the battery is supported by a battery tray and a battery cover, and is positioned near to the intake system.

In such a battery installation structure, the battery tray functions for installing and fixing the battery, and the battery cover functions to block outside heat. However, there is a drawback that cooling efficiency is low since there is no direct cooling device (e.g., cooling wind) for the battery.

Therefore, what is needed is a variable intake system for a vehicle which can significantly improve the cooling efficiency for a battery.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a variable intake system for a vehicle which can significantly improve the cooling efficiency for a battery.

In an aspect of the present invention, a variable intake system for a vehicle to regulate an amount of intake air according to driving conditions of an engine, may include an air cleaner connected to an intake duct which draws in the intake air and forms a flow path for the intake air inside the air cleaner, a battery assembly installed in the flow path inside the air cleaner, wherein the battery assembly may include a plurality of cooling paths that allow the intake air to flow through the plurality of cooling paths, and a valve body installed in the air cleaner, the valve body selectively varying the flow path of the intake air.

A part of the intake air is detoured toward the battery assembly through the valve body in a first driving condition of a first speed of the engine, wherein the part of the intake air that is detoured toward the battery assembly is blocked by the valve body in a second driving condition of a second speed of the engine, the second speed being higher than the first speed.

A part of the intake air that is detoured toward the battery assembly is blocked by the valve body in a second driving condition of a second speed of the engine.

In another aspect of the present invention, a variable intake system for a vehicle to regulate an amount of intake air according to driving conditions of an engine, may include an air cleaner connected to an intake duct, wherein a flow path of the intake air flowing through the intake duct splits into a main path and a detour path, a battery installing part positioned inside the air cleaner to form the detour path therein, a battery assembly installed in the battery installing part, and including a plurality of cooling paths that allow the intake air to flow through the cooling paths, and a valve body installed between the main path and the detour path in the air cleaner and selectively fluid-connecting the main path and the detour path of the intake air.

An outermost cooling path of the cooling paths is continuously fluid-connected to the main path, wherein diameters of the outermost cooling path in the main path and an innermost cooling path in the detour path is larger than diameters of remaining cooling paths of the cooling paths.

The air cleaner may include an intake inflow part integrally connected to the intake duct, and an intake exhaust part configured to be connected to an intake system of the engine, wherein the intake inflow part and the intake exhaust part are continuously fluid-connected through the main path and selectively connected through the detour path.

The battery installing part is provided as a resonator to decrease an intake noise.

The variable intake system for the vehicle may further include a housing wall installed in the battery installing part to form an installation space therein, wherein an outlet is formed at the housing wall and fluid-connected to the installation space, and wherein the intake air passing through the cooling paths of the battery assembly is exhausted therethrough, and a resonator including the detour path therein.

An intake filter that removes foreign substances contained in the intake air passing through the main path and the detour path is installed inside the air cleaner.

A battery case formed with a plurality of sectioned cell spaces is included inside the battery assembly, a plurality of barriers are separately positioned at predetermined intervals inside of the battery case, and a cell space is formed between the plurality of barriers.

The cooling paths are formed on the battery case and on the barriers.

The cooling paths are formed on a bottom panel, on both a first side panel and a second side panel, and on the barriers of the battery case, which are mutually connected, and the cooling paths are formed extending from a front panel through a rear panel of the battery case along a flow direction of the intake air.

In further another aspect of the present invention, a variable intake system for a vehicle to regulate an amount of intake air according to driving conditions of an engine may include an air cleaner connected to an intake duct, wherein a flow path of the intake air flowing through the intake duct splits into a main path and a detour path, a battery installing part positioned inside the air cleaner to form the detour path therein, a battery assembly protrusively installed in the battery installing part towards the main path, wherein the battery assembly may include a plurality of cooling paths that allow the intake air to flow through the cooling paths, and a valve body installed between the main path and the detour path in the air cleaner and selectively connecting the main path and the detour path of the intake air.

A part of the cooling paths of the battery assembly are connected to the main path.

A remaining part of the cooling paths of the battery assembly are connected to the detour path.

Diameters of an outermost cooling path disposed in the main path and an innermost cooling path in the detour path is larger than diameters of remaining cooling paths of the cooling paths.

The variable intake system may further include a housing wall installed in the battery installing part to form an installation space therein, wherein an outlet is formed at the housing wall and fluid-connected to the installation space, and wherein the intake air passing through the cooling paths of the battery assembly is exhausted therethrough, and a resonator including the detour path therein.

According to an exemplary embodiment of the present invention, the amount of intake air that is supplied for the intake system of an engine can be variably regulated through the valve body. Since the cells inside of the battery case can be cooled by air-cooling while the intake air which is drawn into the air cleaner flows through the cooling path of the battery assembly, this may improve the cooling efficiency of the battery assembly.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the exemplary embodiment of the present invention will be described with reference to the accompanying drawings so that those skilled in the Field of the Invention to which the present invention pertains may carry out the exemplary embodiment.

Figure 1:
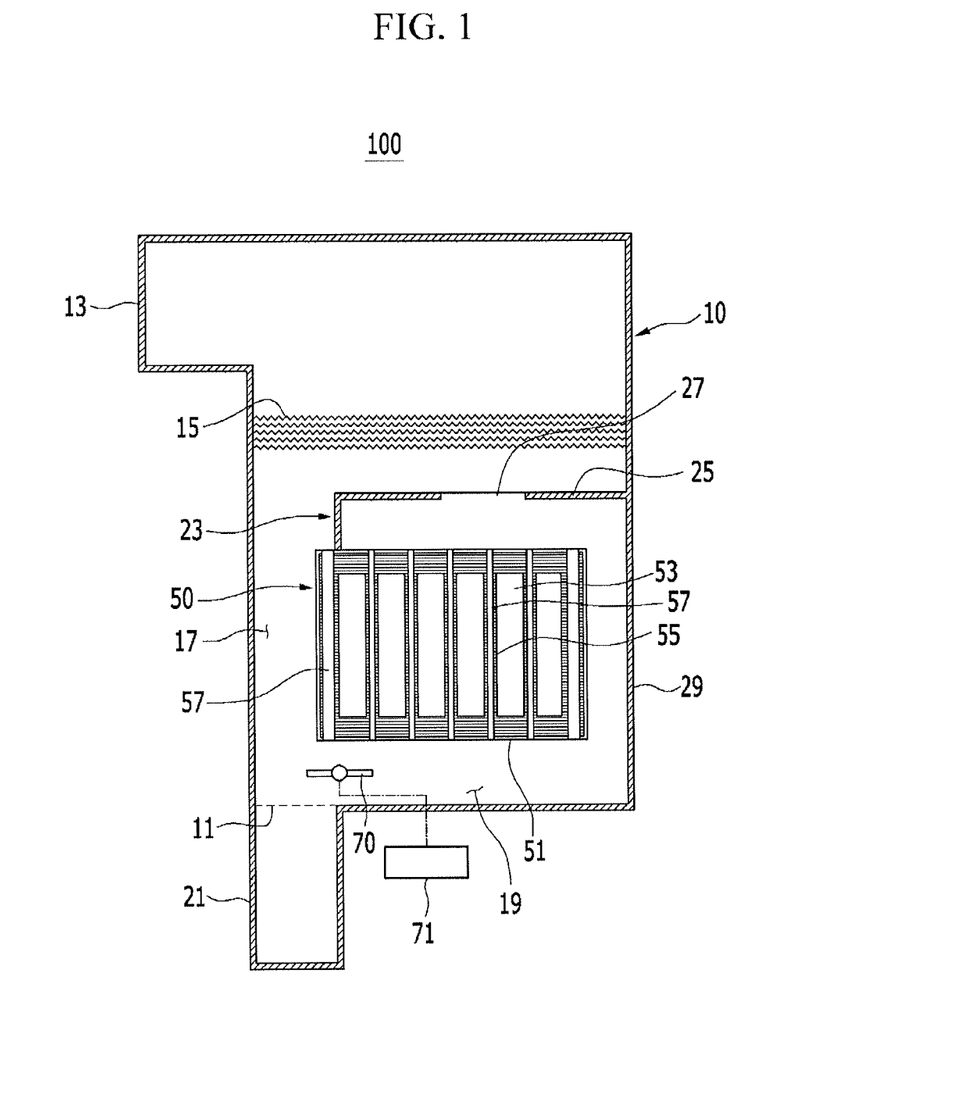
FIG. 1 is a drawing schematically illustrating the constituent elements of a variable intake system for a vehicle according to an exemplary embodiment of the present invention.

FIG. 1 is a drawing schematically illustrating the constituent elements of a variable intake system for a vehicle according to an exemplary embodiment of the present invention.

Referring to FIG. 1, the variable intake system 100 for the vehicle can be applied to the intake system to supply air into each combustion chamber of an engine.

In an aspect of the present invention, the variable intake system 100 may variably regulate the air supplied into each combustion chamber according to driving conditions of the engine, for example, a low-mid speed condition or a high speed condition based on a rotation speed of the engine.

The variable intake system 100 may include a structure which can improve the cooling efficiency for a battery which is installed in an engine compartment to supply electric power for application components for the vehicle.

The variable intake system 100 for the vehicle may include an air cleaner 10, a battery assembly 50 and a valve body 70.

The air cleaner 10 may draw in an intake (air) supplied into each combustion chamber of the engine, and filter foreign substances in the intake. That is, the air cleaner 10 forms a flow path inside of it.

The air cleaner 10 may include an intake inflow part 11, which receives external air inwards, and an intake exhaust part 13 which is connected to an engine intake system, and exhausts the intake. In the air cleaner 10, an intake filter 15 to remove foreign substance from the intake air may be installed between the intake inflow part 11 and the intake exhaust part 13.

An intake duct 21 may be connected to the intake inflow part 11. The intake duct 21 is to supply external air into the engine, and forms an intake pipe connected to the intake inflow part 11. The intake duct 21 may be connected to the intake inflow part 11 as an integral part, or may be engaged with the intake inflow part 11 as a separate part from the intake inflow part 11.

A main path 17 and a detour path 19 may be formed in the air cleaner 10 as the flow path of the intake. The main path 17 may connect the flow through intake duct 21 and the intake exhaust part 13, and the detour path 19 may detour battery assembly 50 and connect the flow through the main path 17 and the intake exhaust part 13.

The intake filter 15 may remove foreign substances from the intake that go through the main path 17 and the detour path 19 inside of the air cleaner 10.

In the detour path 19 of the intake flow path inside the air cleaner 10, a battery installing part 23 may be equipped to install the battery assembly 50 which will be described in more detail below.

In an aspect of the present invention, the battery installing part 23 provides a space for installation of the battery assembly 50 in the detour path 19 of the intake flow path. The installation space is open on the sides adjacent to the intake inflow part 11, the detour path 19 and the main path 17.

In order to section and provide the installation space in the detour path 19, a housing wall 25 that sections the installation space is installed in the battery installing part 23. The housing wall 25 may be integrated with the air cleaner 10 at the intake exhaust side of the detour path 19. An outlet 27 which is connected to the installation space in order to exhaust the intake passing through the detour path 19 may be positioned at the housing wall 25.

The battery installing part 23 may be positioned in the detour path 19 of the intake flow path inside of the air cleaner 10, and may be formed as a resonator 29 to decrease the intake noise through the installation space.

The resonator 29 defines a predetermined installation space in the battery installation part 23, and therefore may decrease intake noise by inducing a resonance phenomenon through the available space excluding the space for the battery assembly 50.

That is, the resonator 29 determines a resonance frequency counting parameters of a volume of the available space remaining, the cross-section, and so on, and may decrease intake noise at a specific frequency using the resonance frequency.

In an aspect of the present invention, the battery assembly 50 supplies electric power for various application components of a vehicle, and may be installed in the flow path of the intake inside of the air cleaner 10 of the vehicle engine compartment.

The battery assembly 50 may be installed within the battery installing part 23 inside of the air cleaner 10, and may be installed on the installation space of the battery installing part 23 with the predetermined installation space being left, as mentioned above. The battery assembly 50 may be fixedly installed on the battery installing part 23 by a separate fixing member.

Figure 2A:
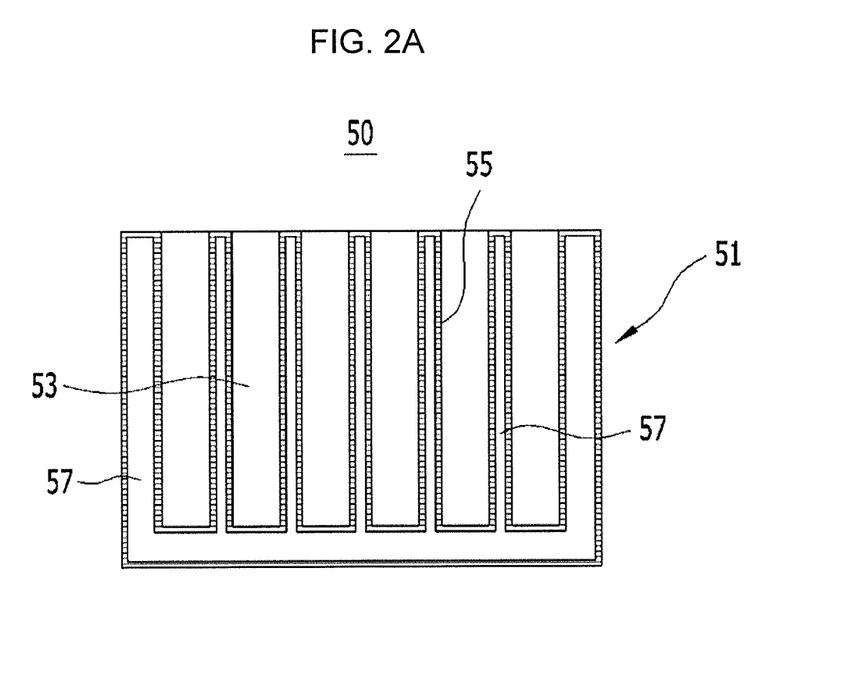
FIGS. 2A and 2B are sectional schematic diagrams illustrating the battery assembly which can be applied to the variable intake system for the vehicle according to an exemplary embodiment of the present invention.
Figure 2B:
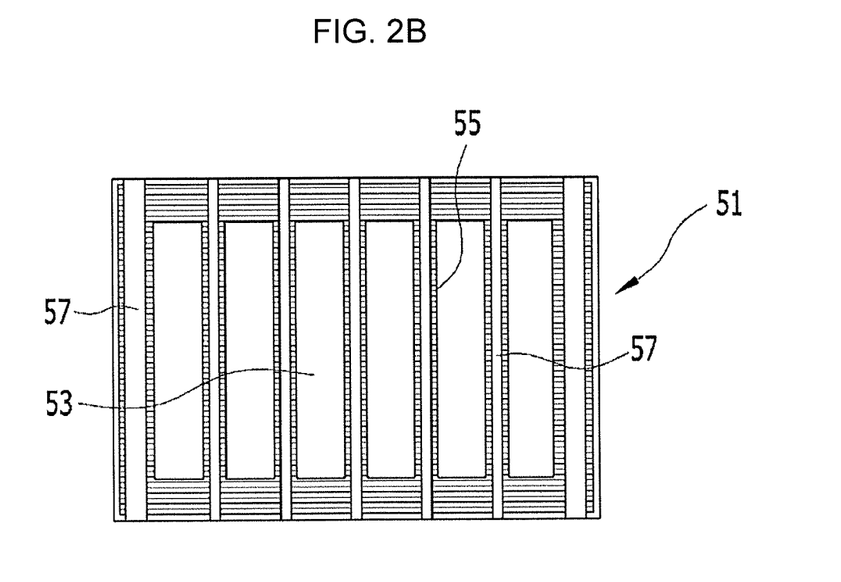

FIGS. 2A and 2B are sectional schematic diagrams illustrating the battery assembly which can be applied to the variable intake system for the vehicle according to an exemplary embodiment of the present invention.

Referring to FIG. 1 and FIGS. 2A and 2B, the battery assembly 50 may include a battery case 51 where a plurality of cells are stored inside.

The battery case 51 may be a case with top, bottom, front, back, left and right sides, and may include a plurality of cell spaces that are sectioned and formed to store cells inside of the battery case 51.

A plurality of barriers 55 may be separately positioned at predetermined intervals inside of the battery case 51, and a cell space 53 may be formed between the barriers 55.

The battery assembly 50 may include cooling paths 57 as additional flow paths for the intake flow through the detour path 19 inside of the air cleaner 10. The cooling paths 57 may allow the intake to flow along the detour path 19 of the flow path, which works as a flow path of the intake for cooling the heat generated by the cells. The cooling paths 57 may be formed in the battery case 51 and on the barriers 55.

The cooling paths 57 may be formed on a bottom panel, on both left and right side panels, and the barriers 55 of the battery case 51, which are mutually connected, and the cooling paths may be formed extending from the front panel through the rear panel of the battery case 51 in the flow direction of the intake.

In an aspect of the present invention, as shown in FIG. 1, the outermost cooling path of the battery assembly 50, that is, the cooling path located at the left side panel which is adjacent to the main path 17 of the battery case 51 may be fluid-connected to the main path 17 of the intake flow path.

In an aspect of the present invention, as shown in FIG. 1, the innermost cooling path of the battery assembly 50, that is, the cooling path located at the right side panel which is adjacent to the inner wall of the resonator 29 may be fluid-connected to the detour path 17.

In an exemplary embodiment of the present invention, diameters of the outermost cooling path and the innermost cooling path is larger than diameters of remaining cooling paths of the cooling paths. Accordingly, the flow resistance in the innermost cooling path is decreased.

Referring to FIG. 1, a valve body 70 may be included in a valve assembly that connects the main path 17 and the detour path 19 of the intake flow path inside of the air cleaner 10. The valve body 70 may connect the main path 17 and the detour path 19 of the intake flow path, and branch off the intake that flows in the air cleaner 10 through the intake duct 21 to the main path 17 and to the detour path 19.

In addition, the valve body 70 may block the connection path between the main path 17 and the detour path 19, and allow the intake that flows in the air cleaner 10 through the intake duct 21 to flow directly to the main path 17 without branching into detour path 19.

Based on the driving conditions of the engine, a part of the intake may be detoured to the detour path 19 which is toward the battery assembly 50 during the condition of low-mid speed of the engine, and the rest of the intake may flow to the main path 17. The intake that detours to the detour path 19 in the direction of the battery assembly 50 may be blocked by the valve body 70, and the intake may flow to the main path 17 during the engine condition of high speed.

The valve body 70 may be installed in the connection path between the main path 17 and the detour path 19 inside of the air cleaner 10. For example, the valve body 70 rotates by an actuator 71, and includes a flap valve that selectively connects the main path 17 and the detour path 19 of the intake flow path.

Since the valve body 70 includes a flap type that is well known by one of ordinary skill in the art, more detailed description will be omitted in the present specification.

Hereinafter, the operation of the variable intake system 100 of a vehicle according to an exemplary embodiment of the present invention will be described with reference to the accompanying drawings.

Figure 3:
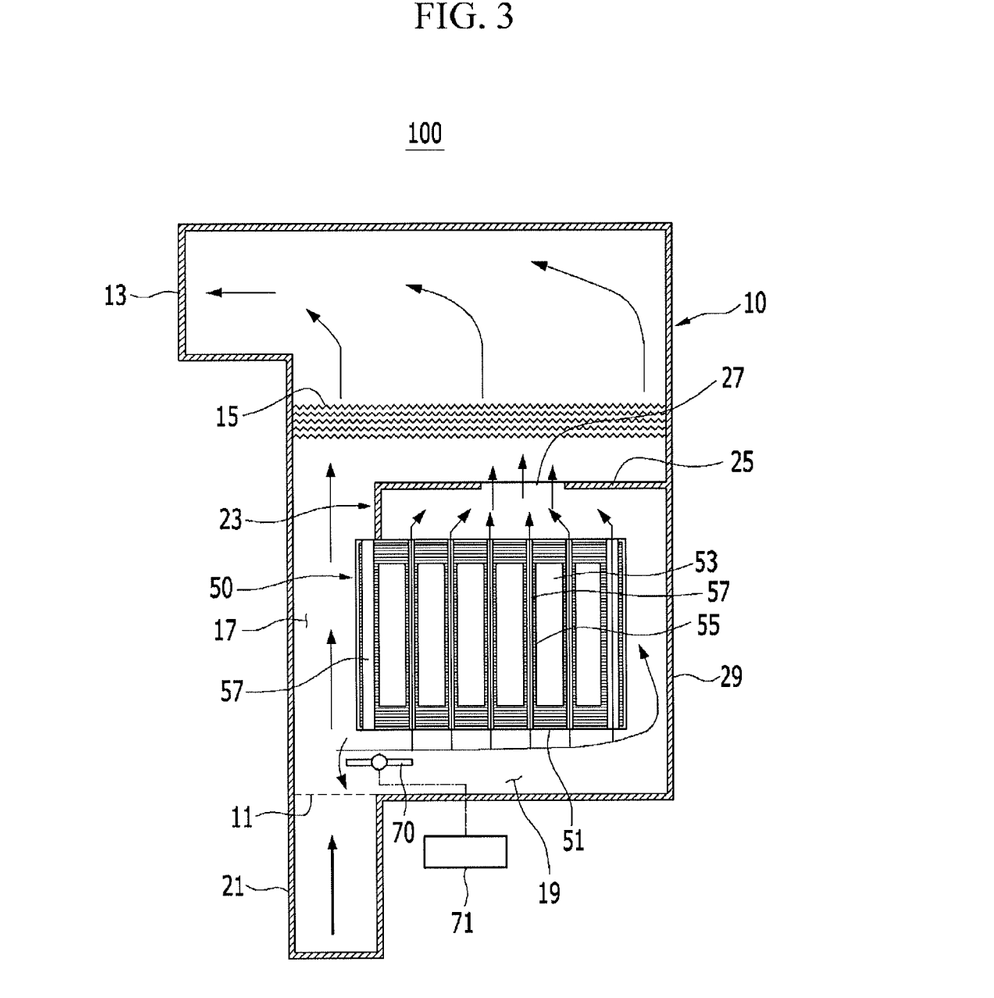
FIG. 3 and FIG. 4 are drawings which illustrate the operation of the variable intake system for the vehicle according to an exemplary embodiment of the present invention.
Figure 4:
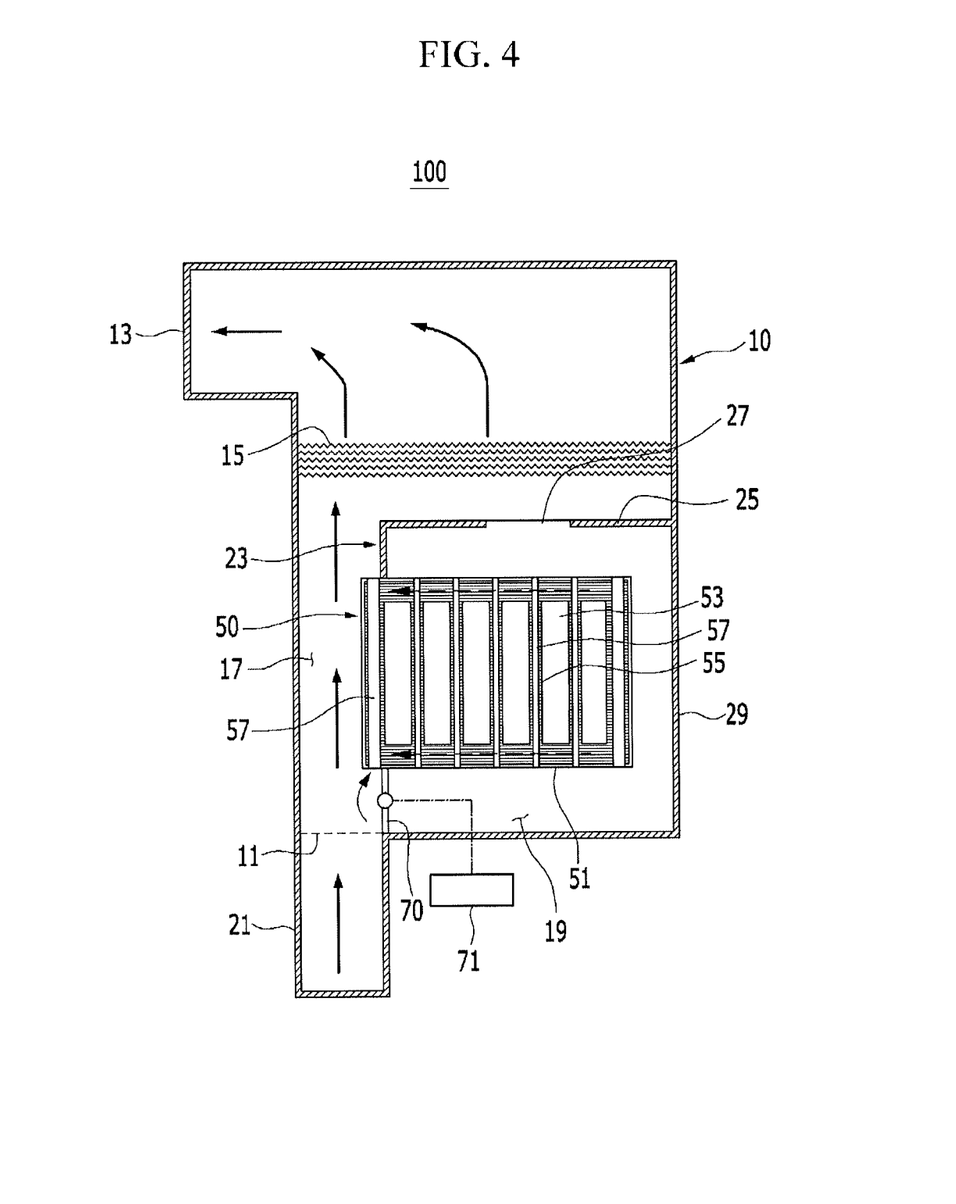

FIG. 3 and FIG. 4 are drawings which illustrate the operation of the variable intake system for the vehicle according to an exemplary embodiment of the present invention.

In an aspect of the present invention, the intake is drawn in through the intake duct 21 to supply air to an intake system of the engine, and the intake is drawn into the air cleaner 10 through the intake inflow part 11.

Referring to FIG. 3, the valve body 70 is rotated to a fixed or particular direction by the actuator 71 in the condition of low-mid speed of an engine according to the driving conditions. Thus, the valve body 70 connects the main path 17 and the detour path 19 of the intake flow path inside of the air cleaner 10 by opening up the connection path between the main path 17 and the detour path 19 inside of the air cleaner 10.

When the valve body 70 opens up the connection path, part of the intake flows to the main path 17 through the valve body 70 in the condition of low-mid speed of an engine, and the rest of the intake flow is detoured to the detour path 19 in the direction of the battery assembly 50.

The intake that flows along the main path 17 flows through the intake filter 15, and is drawn into the intake system of the engine through the intake exhaust part 13 of the air cleaner 10 with foreign substances being removed.

The intake that flows along the detour path 19 is drawn into the installation space of the battery installing part 23, and cools the cells (not shown in the drawings) inside of the battery case 51 while flowing through the cooling paths 57 of the battery assembly 50.

That is, while the intake flows through the cooling paths 57 passing through from the front panel to bottom panel, between both the left and right side panels and the barriers 55 of the battery case 51, which are mutually connected, the intake may refrigerate the cells inside of the cell space 53 sectioned between the barriers 55. That is, the cells inside of the cell space 53 may be cooled by the convection of heat of the intake flowing through the cooling paths 57.

The intake that refrigerates the cells inside of the cell space 53 while flowing through the cooling paths 57 is exhausted through the exhaust port 27 of the housing wall 25 which is part of the battery installing part 23, and is drawn into the intake system of the engine through the intake exhaust part 13 of the air cleaner 10 with the foreign substances being removed while the exhausted flow passes through the intake filter 15.

Since the battery assembly 50 is installed in the installation space of the battery installing part 23 with a predetermined available space being left, the battery installing part 23 functions as a resonator 29 that decreases intake noise by inducing a resonance phenomenon using the available space.

Referring to FIG. 4, in the driving conditions of high speed of an engine, the valve body 70 is rotated in a direction by the actuator 71. The valve body 70 blocks the connection path between the main path 17 and the detour path 19 inside of the air cleaner 10. That is, the valve body 70 blocks the intake that detours to the detour path 19 in the direction of the battery assembly 50. Thus, in the condition of high speed of an engine, the total intake is flowed along the main path 17 through the valve body 70, instead of being detoured to the detour path 19. At this point, the intake flows along the main path 17, passes through the intake filter 15, and is drawn into the intake system of the engine through the intake exhaust part 13 of the air cleaner 10 with the foreign substances being removed while passing through the intake filter.

Since the cooling path 57, located at either of the left or right side panels which is adjacent to the main path 17 of the battery case 51 or the resonator 29, is connected to the main path 17, a part of the intake flowing along the main path 17 flows along the outermost cooling path 57 of the battery case 51. Accordingly, the heat generated by the cells inside of the battery case 51 may have cooled by the convection of heat of the intake that flows along the cooling path 57. The heat generated by the cells may also have been cooled by the intake which is transferred to the cooling path 57 as depicted by the dotted arrow lines in FIG. 4.

In an aspect of the present invention, the amount of intake that is supplied for the intake system of the engine can be variably regulated through the valve body 70.

In addition, since the cells inside of the battery case 51 can be cooled by air-cooling while the intake which is drawn into the air cleaner 10 flows through the cooling path 57 of the battery assembly 50, this may improve the cooling efficiency of the battery assembly 50.

Figure 5:
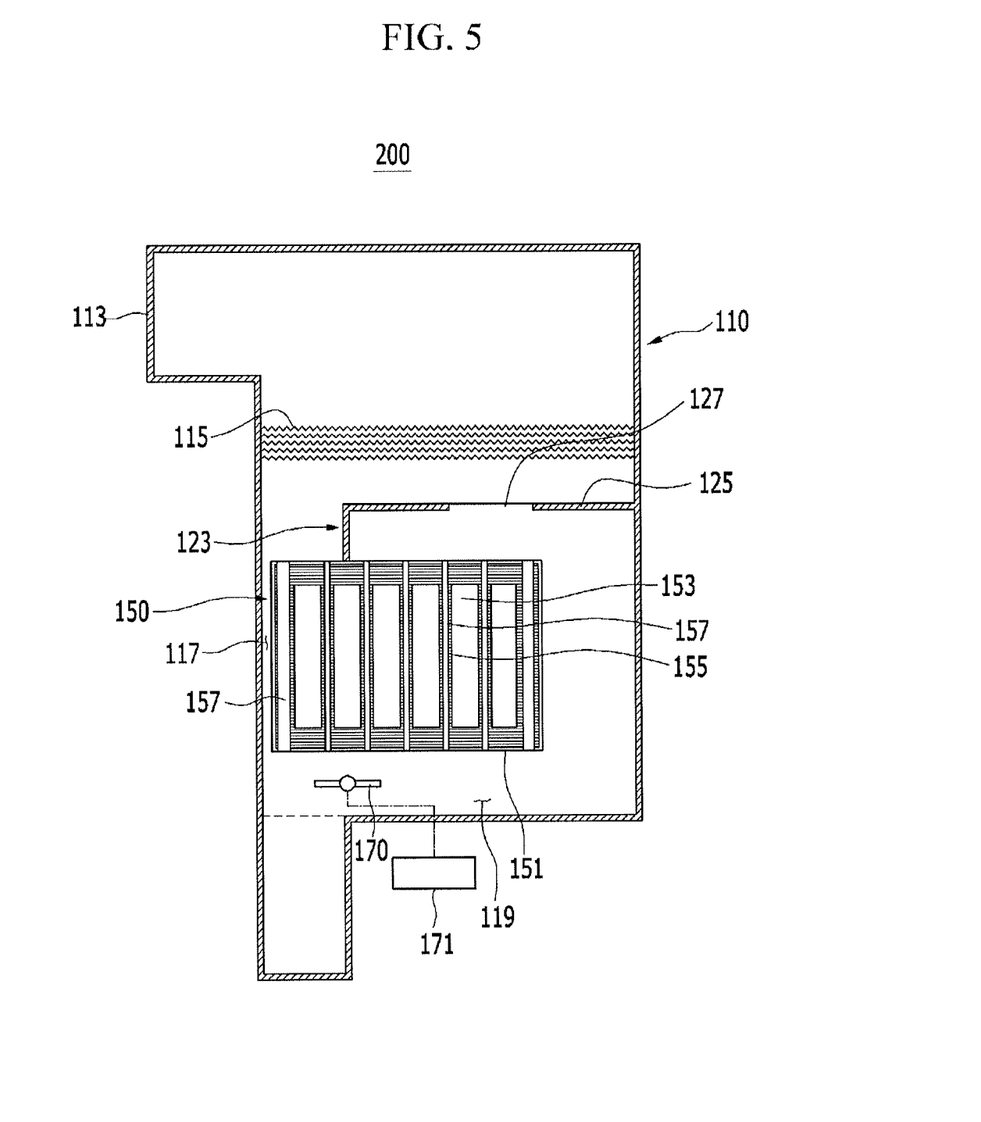
FIG. 5 is a schematic illustration of the constituent elements of a second variable intake system for a vehicle according to an exemplary embodiment of the present invention.

FIG. 5 is a schematic illustration of the constituent elements of a second variable intake system for a vehicle according to an exemplary embodiment of the present invention.

Referring to FIG. 5, the second variable intake system 200 for a vehicle according to an exemplary embodiment of the present invention may have a composition similar to that of the previous exemplary embodiment, which may be protrusively installed in a battery installing part 123 inside of an air cleaner 110 toward a main path 117, and may include a battery assembly 150 in which cooling paths 157 which allow an intake to flow through are formed in a battery case 151.

In an aspect of the present invention, the battery assembly 150 may be installed in such a way that a portion of the battery case 151 is protruded from a battery installing part 123 and toward the main path 117.

A part of the cooling paths 157 may be located toward and connected to the main path 117 and the rest of the cooling paths 157 may be located in the battery installing part 123 and connected to a detour path 119.

Figure 6:
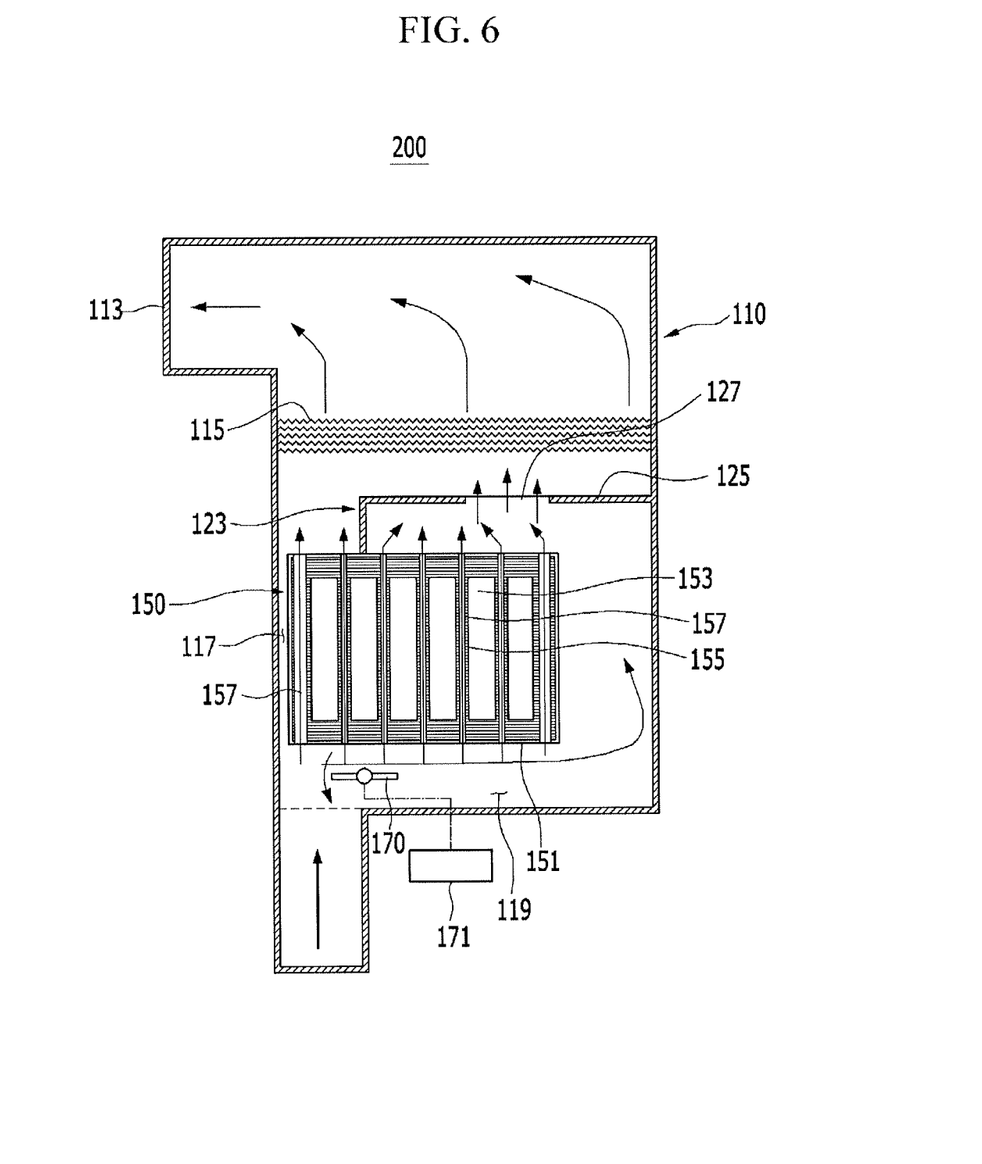
FIG. 6 and FIG. 7 are drawings illustrating the operation of the second variable intake system for the vehicle according to an exemplary embodiment of the present invention.

A valve body 170 that selectively connects the main path 117 and the detour path 119 of the intake flow path may be included inside of the air cleaner 110 in the same way as the previous embodiment. The valve body 170 is rotated in a direction through an actuator 171 in the driving conditions of low-mid speed of the engine as shown in FIG. 6. Through this, the valve body 170 connects the main path 117 and the detour path 119 of the intake flow path inside of the air cleaner 110. A part of the intake flows to the main path 117 through the valve body 170 in the condition of low-mid speed of an engine, and the rest of the intake is detoured to the detour path 119 of the battery installing part 123 toward the battery assembly 150.

Accordingly, the intake that flows along the main path 117 passes through a part of the cooling paths 157 of the battery case 151, may refrigerate a part of cells inside of the battery case 151, and is drawn into the intake system of the engine through the intake exhaust part 113 with foreign substances being removed by passing through an intake filter 115.

In an exemplary embodiment of the present invention, diameters of an outermost cooling path 157 in the main path 117 and an innermost cooling path in the detour path 119 is larger than diameters of remaining cooling paths of the cooling paths.

The intake that flows along the detour path 119 may be drawn into the installation space of the battery installing part 123, and refrigerates the rest of the cells inside of the battery case 151 while passing through the rest of the cooling paths 157. The cells inside of the cell spaces 153 sectioned by the barriers 155 of the battery case 151 may be cooled by the convection of heat caused by the intake that flows along the cooling path 157. The intake that refrigerates the rest of the cells of the battery case 151 in this way is exhausted through an outlet 127 at a housing wall 125 which is part of the battery installing part 123, passes through the intake filter 115, and is drawn into the intake system of an engine through the intake exhaust part 113 of the air cleaner 110 with the foreign substances being removed.

Figure 7:
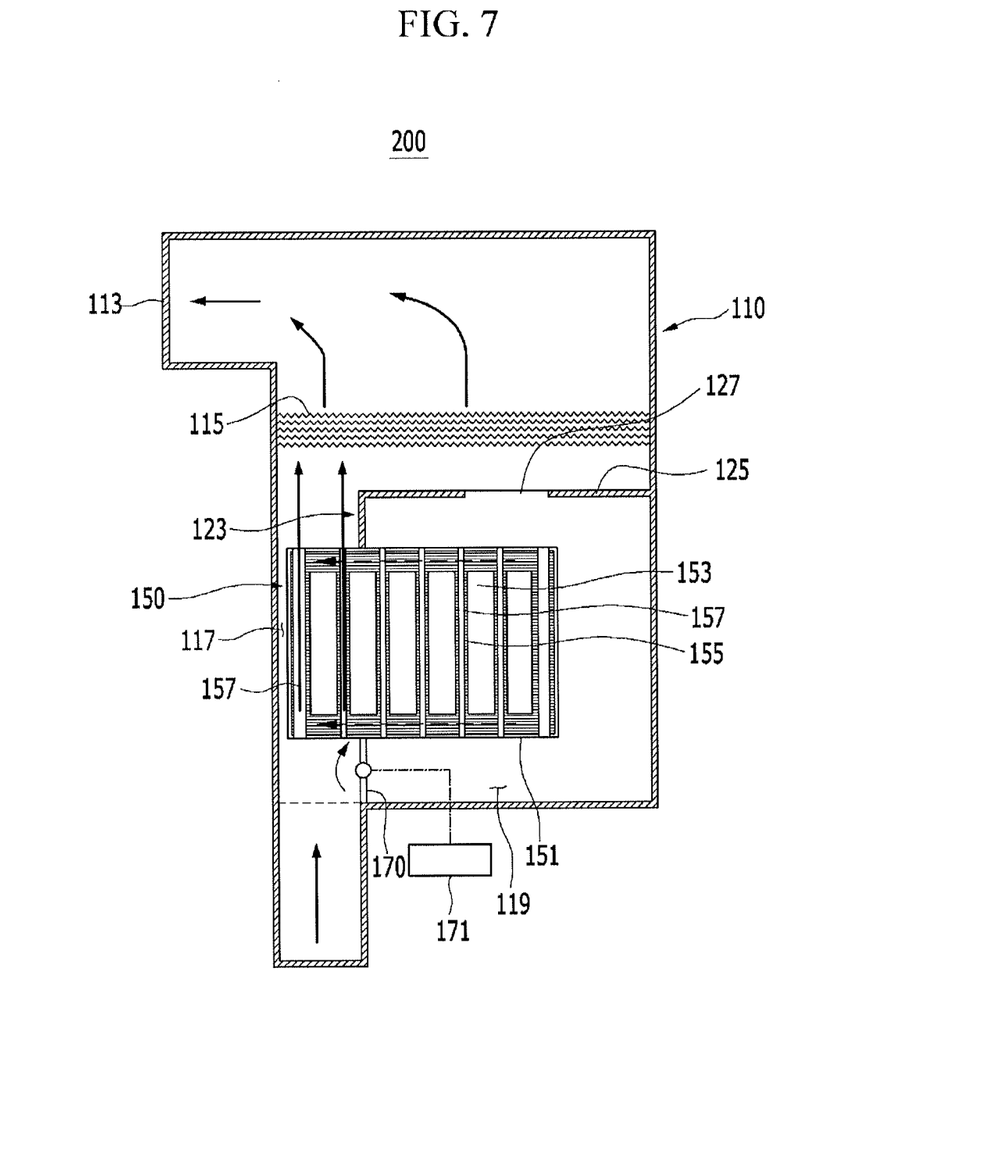

In an aspect of the present invention, the valve body 170 may be rotated in another direction by the actuator 171 in the driving conditions of high speed of the engine as shown in FIG. 7. The valve body 170 may block the connection path between the main path 117 and the detour path 119 inside of the air cleaner 110.

Then, the intake is not detoured to the detour path 119 through the valve body 170 in the condition of high speed of an engine, and the whole intake is flowed into the main path 117. The intake that flows along the main path 117 passes through a part of the cooling paths 157 of the battery case 151, refrigerates a part of the cells inside of the battery case 151, and is drawn into the intake system of the engine through the intake exhaust part 113 with the foreign substances being removed while passing through the intake filter 115.

Since a part of the cooling paths 157 is located toward the main path 117, the intake that flows through the main path 117 may flow along a part of the cooling paths 157. Thus, the heat generated by the cells inside of the battery case 151 may be cooled by the convection of heat caused by the intake that flows along the cooling paths 157, and also cooled by the intake which is transferred to the cooling path 157 as depicted by the dotted arrow lines in FIG. 7.

Since the remaining constituent elements and the operations of the variable intake system 200 for a vehicle according to another exemplary embodiment of the present invention are the same as the previous exemplary embodiment, more detailed description will be omitted.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable intake system for a vehicle to regulate an amount of intake air according to driving conditions of an engine, the system comprising:
    an air cleaner connected to an intake duct which draws in the intake air and forms a flow path for the intake air inside the air cleaner;
    a battery assembly installed in the flow path inside the air cleaner, wherein the battery assembly includes a plurality of cooling paths that allow the intake air to flow through the plurality of cooling paths; and
    a valve body installed in the air cleaner, the valve body selectively varying the flow path of the intake air,
    wherein a part of the intake air that is detoured toward the battery assembly is blocked by the valve body in a second driving condition of a second speed of the engine.

2. The variable intake system for the vehicle of claim 1, wherein a part of the intake air is detoured toward the battery assembly through the valve body in a first driving condition of a first speed of the engine.

3. The variable intake system for the vehicle of claim 2, wherein the part of the intake air that is detoured toward the battery assembly is blocked by the valve body in a second driving condition of a second speed of the engine, the second speed being higher than the first speed.

4. A variable intake system for a vehicle to regulate an amount of intake air according to driving conditions of an engine, the system comprising:
    an air cleaner connected to an intake duct, wherein a flow path of the intake air flowing through the intake duct splits into a main path and a detour path;
    a battery installing part positioned inside the air cleaner to form the detour path therein;
    a battery assembly installed in the battery installing part, and including a plurality of cooling paths that allow the intake air to flow through the cooling paths;
    a valve body installed between the main path and the detour path in the air cleaner and selectively fluid-connecting the main path and the detour path of the intake air;
    a housing wall installed in the battery installing part to form an installation space therein, wherein an outlet is formed at the housing wall and fluid-connected to the installation space, and wherein the intake air passing through the cooling paths of the battery assembly is exhausted therethrough; and
    a resonator including the detour path therein.

5. The variable intake system for the vehicle of claim 4, wherein an outermost cooling path of the cooling paths is continuously fluid-connected to the main path.

6. The variable intake system for the vehicle of claim 5, wherein diameters of the outermost cooling path in the main path and an innermost cooling path in the detour path is larger than diameters of remaining cooling paths of the cooling paths.

7. The variable intake system for the vehicle of claim 4, wherein the air cleaner includes:
    an intake inflow part integrally connected to the intake duct; and
    an intake exhaust part configured to be connected to an intake system of the engine,
    wherein the intake inflow part and the intake exhaust part are continuously fluid-connected through the main path and selectively connected through the detour path.

8. The variable intake system for the vehicle of claim 4, wherein the battery installing part is provided as a resonator to decrease an intake noise.

9. The variable intake system for the vehicle of claim 4, wherein an intake filter that removes foreign substances contained in the intake air passing through the main path and the detour path is installed inside the air cleaner.

10. The variable intake system for the vehicle of claim 4, wherein a battery case formed with a plurality of sectioned cell spaces is included inside the battery assembly;
    wherein a plurality of barriers are separately positioned at predetermined intervals inside of the battery case; and
    wherein a cell space is formed between the plurality of barriers.

11. The variable intake system for the vehicle of claim 10, wherein the cooling paths are formed on the battery case and on the barriers.

12. The variable intake system for the vehicle of claim 10,
wherein the cooling paths are formed on a bottom panel, on both a first side panel and a second side panel, and on the barriers of the battery case, which are mutually connected; and wherein the cooling paths are formed extending from a front panel through a rear panel of the battery case along a flow direction of the intake air.

13. A variable intake system for a vehicle to regulate an amount of intake air according to driving conditions of an engine, the system comprising:

an air cleaner connected to an intake duct, wherein a flow path of the intake air flowing through the intake duct splits into a main path and a detour path;

a battery installing part positioned inside the air cleaner to form the detour path therein;

a battery assembly protrusively installed in the battery installing part towards the main path, wherein the battery assembly includes a plurality of cooling paths that allow the intake air to flow through the cooling paths; and a valve body installed between the main path and the detour path in the air cleaner and selectively connecting the main path and the detour path of the intake air, wherein diameters of an outermost cooling path disposed in the main path and an innermost cooling path in the detour path is larger than diameters of remaining cooling paths of the cooling paths.

14. The variable intake system for the vehicle of claim 13, wherein a part of the cooling paths of the battery assembly are connected to the main path.

15. The variable intake system for the vehicle of claim 14, wherein a remaining part of the cooling paths of the battery assembly are connected to the detour path.

16. The variable intake system for the vehicle of claim 13, further including:

a housing wall installed in the battery installing part to form an installation space therein, wherein an outlet is formed at the housing wall and fluid-connected to the installation space, and wherein the intake air passing through the cooling paths of the battery assembly is exhausted therethrough; and a resonator including the detour path therein.

* * * * *